Oct. 4, 1955

C. M. L. L. BOURCIER DE CARBON DE PRÉVINQUIÈRES 2,719,612

SHOCK ABSORBERS

Filed Feb. 23, 1950

INVENTOR

C. M. L. L. Bourcier de Carbon de Prévinquières

By Watson, Cole, Grindle & Watson

ATTORNEYS

United States Patent Office
2,719,612
Patented Oct. 4, 1955

2,719,612

SHOCK ABSORBERS

Christian Marie Lucien Louis Bourcier de Carbon de Prévinquières, Paris, France

Application February 23, 1950, Serial No. 145,788

Claims priority, application France June 14, 1946

34 Claims. (Cl. 188—88)

This invention relates to shock absorbers and more particularly to shock absorbers of the fluid displacement type adapted especially for use on automotive vehicles, although usable in cushioning or braking shocks sustained by other devices and mechanisms.

This application is a continuation-in-part of my co-pending applications; Serial No. 755,422, filed June 18, 1947; Serial No. 22,836, filed April 23, 1948; and Serial No. 102,784, filed July 2, 1949; all now abandoned.

The general object of the invention is the provision of a shock absorber of the class described which, when used in connection with vehicle wheel spring suspensions, will afford a much more comfortable ride than the prevalent type of cushioning devices, and which may be produced much more easily and economically.

One of the principal objects of the invention is to provide a shock absorbing system which makes use of the viscosity of the oil or other fluid used, as a means of damping, whereby the damping effect is proportional to the speed of displacement of the relatively moving parts and may, if desired, be substantially symmetrical in each direction of movement away from the medial point of repose. Thus, the present development is opposed to the principle commonly followed involving damping by kinetic energy which is proportional to the square of the piston speed.

Not only is the riding comfort of vehicles equipped with this novel shock absorber enhanced, but also the control of the car and the braking action are improved, since the wheels are enabled to follow the road surface at all times despite the occurrence of hollows or bumps therein.

Further objects of the invention include the provision of a novel piston structure operating in the fluid contained in the shock absorber cylinder; a novel and improved expansion or reservoir chamber arrangement for controlling the passage of fluid from the working chamber as the entrance of the piston rod displaces fluid; the provision of novel baffling means within the displacement chamber for minimizing or preventing foaming or emulsification of the fluid when such fluid is a liquid and the resulting cavitation during operation.

Other objects and features of novelty will be apparent from the following specification when read in connection with the accompanying drawings in which certain embodiments of the invention are illustrated by way of example.

The present invention is based upon certain mathematical developments and conclusions which are apparently contrary to the classic conception which has governed the design and construction of shock absorbers now in use, which conception considers that a good shock absorber must be one of single action, that is, one which brakes on rebound only.

The optimum of comfort of a vehicle suspended by springs is obtained when each shock absorber introduces between the axle and the chassis a resistance F which is proportional to the speed $v$ of each displacement of the one member with respect to the other, in compression as well as rebound. These conditions may be summarized by stating that the law of damping must be linear, double-acting, and symmetrical.

More precisely, the resistance F should have the form $F=fv$, $f$ being the numerical coefficient having the value $$f=\sqrt{\frac{MK}{2}}\sqrt{\frac{P+2K}{P}}$$

M being the suspended mass on the wheel; K being the rigidity of the spring suspension, that is, the opposite of its flexibility; and P being the rigidity of the tire.

Moreover, and uniquely, the resistance F should be proportional to the speed $v$ and should definitely not be a function of the acceleration $$\frac{dv}{dt}$$

this last condition being extremely important if a smooth ride is sought. The acceleration increasing as the square of the frequency, for a given amplitude of movement (the speed being merely proportional to the frequency), any effect of acceleration would only harden or stiffen the suspension in the case of rapid oscillations of the wheels. However, it is difficult to attain a practical realization of the two conditions, namely, the braking F of the shock absorber being proportional to the speed $v$ of the piston, and the independence of F from the acceleration $$\frac{dv}{dt}$$

in the variations of regime. This has only now been attained by the provisions of the present invention in which a piston is employed which exerts a braking action by pure viscosity of fluid around the margins thereof, and without any kinetic damping.

The characteristic of this piston is that it brakes the fluid not by forcing it through orifices, valves, or ports drilled through the piston, but by forcing the oil to pass around the piston between the peripheral wall of the piston and that of the cylinder in an extremely thin annular film. This film is of a thickness of a fraction of a millimeter (a few thousandths of an inch).

The theoretical considerations underlying the principles of the present invention will be understood from the following:

A suspension shock absorber is essentially a brake to any relative movements of the axle and chassis, that is, a mechanism for the dissipation of energy. In the case of a hydraulic shock absorber, the dissipation of energy by means of a liquid can only be produced in two ways, either by kinetic damping, corresponding to the kinetic energy of the liquid when passing through calibrated orifices or valves, or the viscous damping of the liquid through or around the piston. In actual practice these two methods are more or less intermingled and one effect can probably not be entirely isolated from the other, but one can render one or the other more or less preponderant by proper choice of the damping conditions, that is the type of piston employed.

In the case of a piston drilled with calibrated orifices of a cylindrical shape, calculations show that kinetic damping is absolutely preponderant, but such kinetic damping is proportional to the square of the velocity of the piston. It is easy to perceive that this proceeds according to a very rapidly increasing law, and "single action" damping is necessary to prevent too strong reactions upon the chassis. By providing the piston openings with valves having kinetic damping and opening more or less according to the pressure, means might possibly be conceived which permits one to approach the linear law $F=fv$, when the speed $v$ of the piston remains constant. However, the practical realization of a valve which would conform rigorously to the linear law is an extremely difficult problem. Furthermore, a shock absorber on a vehicle never works at a constant speed $v$, the movement of the piston being essentially variable, being necessarily alternating.

The results of a complete study of liquids having a variable flow show that, when there is present a damping of kinetic origin, the total kinetic damping is necessarily the result of these two distinct kinetic effects, and therefore roughly the sum of two terms.

First, a term of constant regime, equal to $$S\frac{d}{2}u^2$$

S being the total area of the piston,
d being the density of the oil,
u being the velocity of the oil when leaving the orifice or valve.

It is easy to see that in the case of a constant orifice of area $o$, this damping of constant regime is equal to $$\frac{S^3}{o^2}\frac{d}{2}v^2 \qquad (1)$$

Second, a term of variable regime, the function increasing according to the acceleration, in the case of a piston of constant orifice, is equal to $$A\frac{S}{o}\frac{du}{dt}$$

that is, $$A\frac{S^2}{o^2}\frac{dv}{dt} \qquad (2)$$

A being a constant function depending on the shape of piston and orifice and roughly equal to the mass of liquid in rapid movement near the orifice. Under the conditions of operation of the shock absorber, this second term is not negligible during the rapid movements of the wheels. Moreover, I have stated that this term, function of the acceleration, is undersirable and injurious to comfort. Therefore, the only physical possibility of realizing a hydraulic shock absorber conforming perfectly to the optima theoretical conditions is to find a shock absorber of pure viscosity without any appreciable effect of kinetic damping.

Consequently, only such a shock absorber, if it is possible to make one, will be able to satisfy the two necessary theoretical conditions which I have stated: damping proportional to the speed $v$ of piston and independent of acceleration $$\frac{dv}{dt}$$

The preceding conditions, and in particular the two Formulas 1 and 2, show that the only means of rendering negligible the kinetic damping of constant regime and the one at variable regime will be to have an area of passage $o$ as large as possible. I am compelled, therefore, to realize a viscous damping of given coefficient $f$, and also having the largest possible surface of passage $o$.

The problem thus stated, its solution will develop without any great difficulties, by the logical analysis of the laws of flow of viscous liquids. I shall omit the details of mathematical calculations which justify it, and shall only set forth the solution which is as follows:

There are two possibilities for realizing a piston of pure viscosity: the first is to use a piston drilled with a great number of cylindrical channels. The second is to use a "laminating" piston; that is, one in which the damping is effected by the lamination of the liquid between two parallel surfaces disposed very closely together.

With a piston of cylindrical channels, if I neglect the kinetic damping of variable regime, I obtain for the damping a mixed law of the form $F=fv+Bv^2$. In this formula the coefficient $f$, resulting from the laws of viscous flow of Poiseuille, is given by the expression:

$$f=\frac{8\pi}{n}\frac{R^4}{r^4}h\alpha \qquad (3)$$

in which:

R is the radius of piston,
r the radius of the channels,
h the height of the channels,
n the number of the channels, and
α the viscosity of the liquid used.

For the coefficient B of kinetic damping of constant regime, it is the result of the classic hydrodynamic laws and it could be calculated approximately and is given by the formula:

$$B=\frac{d}{2}\frac{S^3}{o^2} \qquad (4)$$

in which:

S is the area of the piston,
o the total area of channels,
d the density of the liquid, which gives:

$$B=\frac{d\pi}{2n^2}\frac{R^6}{r^4} \qquad (5)$$

The practical calculation of coefficients $f$ and B with the help of the preceding formulas show that, for the oils generally used, and for every practical dimension acceptable for the cylinder and piston, the injurious kinetic damping $Bv^2$ is rapidly preponderant as compared with the useful viscous damping $fv$. In fact, we have:

$$\frac{\text{kinetic damping } Bv^2}{\text{viscous damping } fv}=\frac{d}{16\alpha}\frac{R^2}{nh}v \qquad (6)$$

and suppose:

$R=h=2$ centimeters (.787″),
$n=1$,
$d=0.9$,
$\alpha=0.23$ poise.

By these conditions it could be seen that for a very moderate speed of 40 centimeters (1.31 feet) per second of the piston into cylinder, the disturbing kinetic damping is twenty times greater than the useful viscous damping, and this regardless of the diameter of the cylindrical channel.

With a laminating marginal by-pass piston such as the one represented in the drawings, if the variable regime kinetic damping is disregarded, the law of damping is still in the form $F=fv+Bv^2$, but now it can be shown that the coefficient $f$ is then given by the formula:

$$f = \sigma \pi \frac{R^3 h}{e^3} \alpha \qquad (7)$$

in designating by $e$ the width of the laminating passage between piston and cylinder; while the coefficient $B$ is still given by the Formula 4 and could be written:

$$B = \frac{d\pi}{8} \frac{R^4}{e^2} \qquad (8)$$

Keeping in mind the preceding conditions, Formula 7 shows clearly that to have a viscous damping of two kilograms (4.40 lbs.) per centimeter second (the value in the case of the average passenger car), the width of the laminating passage $e$ should be 0.31 millimeter (0.012″). On the other hand, Formulas 7 and 8 show that with a laminating piston we have:

$$\frac{\text{kinetic damping } Bv^2}{\text{viscous damping } fv} = \frac{d}{48\alpha} \frac{Re}{h} v$$

which permits us to calculate that, for the same speed of 40 centimeters per second (1.31 ft.), the disturbing kinetic damping is only one tenth of the useful viscous damping. It is seen that with a laminating piston, the disturbing kinetic damping is about 200 times less than that with a piston with a single cylindrical channel having the same viscous damping. This value shows the superiority of the laminating piston. To obtain the same result with a piston having several channels, it will be necessary to have a piston drilled with 200 channels, as it could be seen with the help of Formula 6.

Referring again to Formulas 1 and 2 we see that the kinetic damping is inversely proportional to the square of the area of the passageway $\sigma$. This fact is quite important showing that the kinetic damping, particularly of variable regime, is deleterious to the smooth rolling of the vehicle, since it is proportional to the vertical accelerations of the wheel in relation to the chassis, the accelerations themselves being proportional to the square of the frequency. Further, the injurious results are more difficult to prevent than those resulting from kinetic damping at constant regime. Some attempts have been made to overcome these difficulties, for example, by the provision of a simple valve having a progressive opening to at least theoretically provide a piston having linear operation at constant regime, but this solution still retains the qualification that the damping is proportional to the acceleration. The applicant has found that it is necessary to eliminate entirely the effect of acceleration and in doing so has arrived at the solution of providing a hydraulic or pneumatic piston operating upon pure viscosity.

Figure 1:
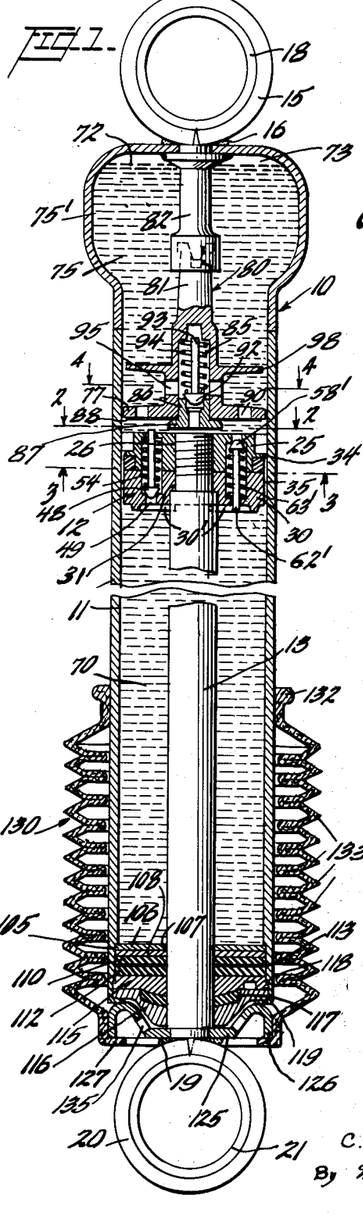
Figure 1 is a view in vertical section of a shock absorber embodying the principles of the invention, this view being taken on the angular section line 1—1 of Figure 2.
Figure 2:
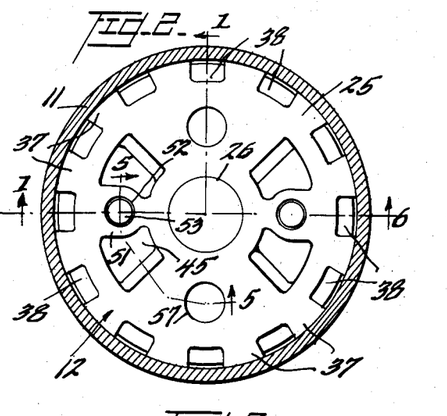
Figure 2 is a horizontal sectional view taken on line 2—2 of Figure 1, and showing the piston member in top plan.

In Figure 1 of the drawings, there is illustrated a shock absorber embodying these principles of the invention, the shock absorber being indicated in its entirety by the reference numeral 10 and comprising a cylindrical tubular casing or housing 11 in which there is disposed for vertical reciprocation a piston member designated generally by the reference numeral 12 and carried upon the end of a piston rod 13 which passes through a packed opening in the lower end of the casing or cylinder 11. It is important that the cylinder be fixed with relation to the chassis or body of the vehicle and that the piston be secured to the axle or wheel mounts. The upper end of the cylinder 11 may be secured to the chassis by means of the ring 15 which is welded as at 16 to the head of the cylinder and which may be provided with a ring or grommet 18 made of rubber or other resilient material, through which a pin or bolt may extend from the chassis. Welded to the lower end of the piston rod 13 as at 19 is a similar securing ring 20 which is also provided with a rubber grommet 21 through wihch may extend a bolt from the wheel mounting.

The piston member 12 is preferably made in two parts, the upper portion 25 having a central threaded opening 26 to receive the attenuated threaded upper end of the piston rod 13. The lower piston section 30 fits snugly against the upper section and is provided with a shouldered central opening 31 which is not provided with threads but is fitted to the shouldered portion of the piston rod 13 so that when the upper piston portion 25 is tightened upon the threads, the lower portion 30 is pressed snugly against the shoulder on the piston rod.

Figure 3:
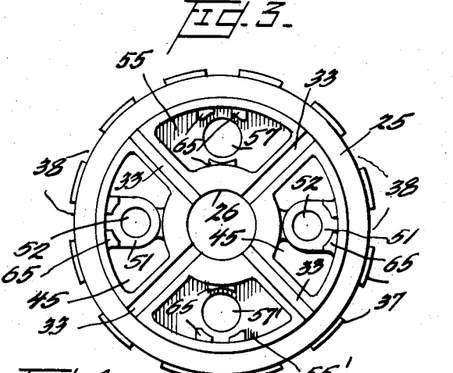
Figure 3 is a bottom plan view of the upper section of the two-part piston, such as would be seen on line 3—3 of Figure 1 looking upwardly.
Figure 4:
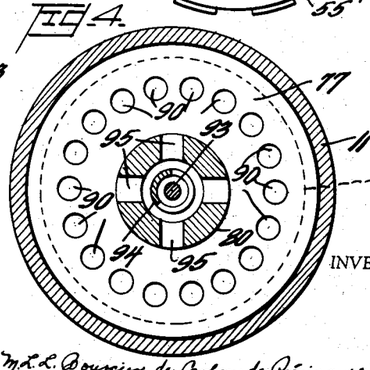
Figure 4 is a horizontal sectional view through the fluid reservoir or expansion chamber taken on line 4—4 of Figure 1.
Figure 5:
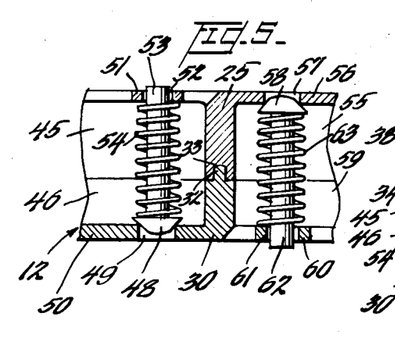
Figure 5 is a fragmentary vertical curvilinear sectional view taken substantially on the arc 5—5 of Figure 2.

As clearly shown in Figures 3 and 5 of the drawings, the lower piston section 30 is provided with diametrically extending ribs or tongues 32 which fit within grooves 33 formed in the upper section 25, thus preventing relative rotation of the two parts of the piston, and also providing a liquid seal between the valve chambers in the piston which will be described presently.

Figure 6:
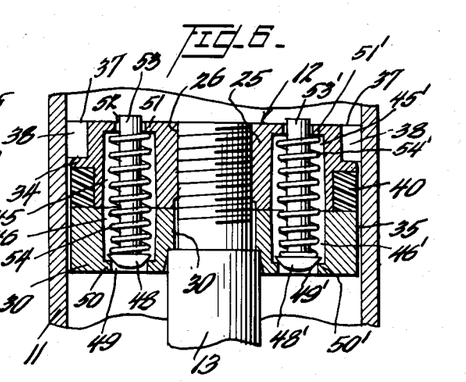
Figure 6 is a vertical diametrical sectional view through the piston taken on line 6—6 of Figure 2.
Figure 7:
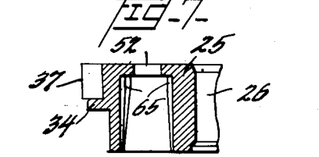
Figure 7 is a fragmentary vertical sectional view of a portion of the upper section of the piston with the valve and spring removed.

As indicated in Figures 1 and 6 of the drawings, the lower piston part 30 and the flange 34 of the upper part 25 are of a diameter slightly less than the internal diameter of the cylinder 11 so that there is provided between the main parts of the piston and the wall of the cylinder a thin annular space or clearance 35 through which the fluid passing from one side of the piston to the other takes the form of a thin film or lamination. The vertical depth of the clearance space 35 through which the oil flow is laminated, is quite appreciable. In other words, this clearance is somewhat more than that which would be provided by a very thin disc. In one preferred embodiment of the invention, the vertical height of the piston head itself is in the neighborhood of from about three-quarters of an inch to about one inch, and the effective height of the clearance passageway is very slightly less, say approximately from about one-half of an inch to about three-quarters of an inch.

It is preferred that the annular laminating space or clearance 35 be of uniform thickness throughout the periphery of the piston and cylinder, but slight variations in centering will not seriously affect the proper operation of the device. A total eccentricity would alter the principle of operation disastrously, however, and therefore provision is made for maintaining the laminating parts of the piston centered with respect to the axis of the cylinder. For this purpose the upper portion 25 of the piston 12 is provided with an annular series of projections 37 alternating with openings 38 of considerable width. The projections 37 fit snugly against the inside walls of the cylinder 11 and slide against these walls during operation of the device, maintaining the piston centered with respect to the cylinder. The gaps or notches 38 provide an abundance of space for the passage of fluid freely to the laminating passageway 35 and are of such capacity that they have no effect in damping the movement of the piston.

Since the device operates upon the principle of pure viscosity, and the damping is therefore rigorously proportional to the viscosity of the oil or other fluid used, some method of thermostatic compensation for changes of viscosity in the oil according to temperature, must be adopted. With the best oils now used in shock absorbers, the viscosity diminishes by about one-half for an increase in temperature of 22–25° C. (71.6–77° F.). The use of a laminating piston such as has just been described permits an adequate solution of this difficult problem. A portion of the body of the piston is made of a material sufficiently expansible to reduce the thickness of the laminating passageway 35 enough to compensate for the loss in damping resulting from a reduction in the viscosity of the oil. In the preferred form of the device, an annular block or ring 40 of a material, the coefficient of thermal expansion of which approximates the coefficient of thermal viscosity of the oil, is employed. This ring 40 fits beneath the flange 34 of the upper piston section 25 and the upper face of the lower piston section 30 as clearly seen in Figures 1 and 6 of the drawings. Among materials which could be used in making the ring 40 might be suggested certain plastics such as "plexiglas," polystyrol, or nylon. The applicant has discovered that in the case of nylon, of which the coefficient of expansion is ten times that of steel, it is possible to provide a piston for use with standard shock absorber oils which will effect a viscous damping which will be practically constant within ranges up to and above 50° C. (122° F.) which is more than sufficient for practical purposes. The nylon ring 40 provides for the changes in the lamination according to temperatures while the bulk of the piston is made of metal in order to provide sufficient mass to retain adequate resistance.

It has already been mentioned in the theoretical discussion that it is well to provide safety valves within the piston 12, these valves having no essential function in the viscous damping, but merely serving to limit the damping efforts of the shock absorber during very rapid or sudden movements of the wheels.

It will be noted that each of the piston halves 25 and 30 are provided with hollowed-out portions or chambers, of which there are preferably four in each case, the hollows or recesses in the upper portion 25 opening downwardly and registering with similar upwardly facing recesses or cavities in the lower portion 30 of the piston. For example, one of these hollowed-out portions or cavities may be located at the left-hand portions of Figures 2, 3, 5 and 6 and designated by the reference numeral 45. This downwardly opening cavity in the upper section of the piston is faced by an upwardly opening similarly formed cavity 46 in the lower portion 30. The combined cavities 45, 46 form a chamber adapted to contain the safety valve 48 which controls the passage of fluid through the opening 49 in the lower wall 50 of the lower piston part 30. The cavity 45 in the upper piston member is bridged by a web portion 51 flush with the upper surface of the upper portion 25 of the piston and provided with an opening 52 through which may be guided the stem 53 of the valve 48. This web or bridging portion also provides a seat for the coil spring 54 which surrounds the valve stem and bears beneath the valve head 48, urging the valve toward closed position.

It will thus be seen that fluid from above the piston may freely enter the cavity or chamber 45, 46, but the valve 48 controls the passage of fluid from the lower side of the piston into the cavity.

The arrangement of valves and openings is duplicated upon the diametrically opposite side of the piston 12 and the several parts are given the same reference numerals with the addition of a prime (').

Displaced by 90° from the chamber 45, 46 there is provided an arrangement which is just the opposite of the one just described, whereby the flow of fluid from the upper side of the piston to the lower side thereof is controlled. Referring to the lower portions of Figures 2 and 3 and the right-hand portion of Figure 5, it will be seen that a cavity 55 is provided in the upper member 25 of the piston, which cavity is provided with an upper wall 56 having an opening 57 therein controlled by the valve 58. The lower piston member 30 is provided with a corresponding cavity 59 which is freely open to the space beneath the piston but is bridged by the web 60 which is provided with an opening 61 to accommodate the stem 62 of the valve 58 and to provide a seat for the valve spring 63. This arrangement is duplicated in the diametrically opposite side of the piston portion, thus providing a pair of valves controlling the flow of fluid from the upper to the lower side of the piston.

For the purpose of furnishing better guides for the coil springs 54 and 63, ribs or projections designated indiscriminately by the numerals 65 may be provided upon the walls of the cavities in the respective piston sections.

The lower ends of the stems of the valves 58 and 58' may project through their guides beyond the lower surface of the bottom half 30 of the piston and thus the device may be damaged by the impingement of the stems against the bottom of the cylinder 11, upon extreme extension of the device. In order to prevent this, the lower surface of the piston half 30 is provided with one or more protuberances which may conveniently take the form of the arcuate ribs 30'.

During travel on a smooth or gently undulating road at average speeds, the piston moves up and down in the cylinder and the fluid passes through the clearance passageway 35 between the piston and cylinder walls in a thin lamination, serving to adequately damp the oscillations of the wheels. However, upon encountering a rough road or an obstacle or depression the pressure builds up quickly upon one side or the other of the piston and the corresponding piston valves 48 and 48' or 58 and 58' open to relieve the excess pressure.

Figures 8, 13:
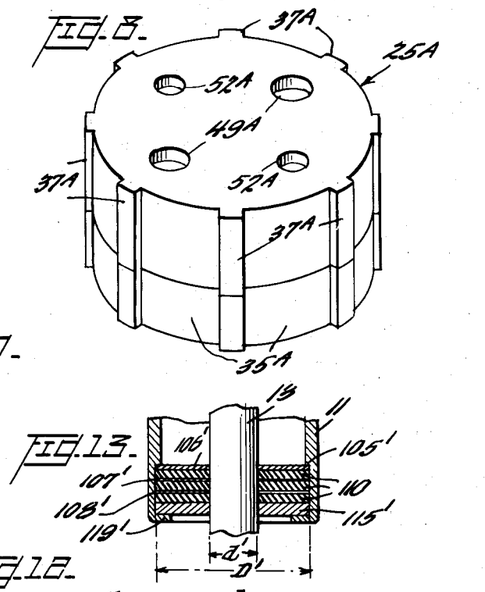
Figure 8 is a view in perspective of a modified form of piston.
Figure 13 is a fragmentary view in vertical section of the lower end of the cylinder showing another embodiment of the packing arrangement for the piston rod.

In Figure 8 there is shown a modified form of piston designated 25A and provided with ribs 37A extending for approximately the full height thereof, the diameter of the piston between the ribs being less than the internal diameter of the cylinder in order to provide lamination spaces 35A for the fluid. The piston may be of a construction otherwise similar to the one shown in Figures 1–7 of the drawings, and thus it might be provided with valve openings 49A and valve stem guiding openings 52A.

In operation, the cylinder 11 is nearly filled with motive fluid which may be a light oil of the viscosity generally used in shock absorbers or aeroplane struts in general use. It is readily apparent that during the reciprocating movement of the piston 12 a greater or lesser length of the piston rod 13 will occupy the working space 70 of the cylinder 11. Thus, during the upward stroke of the piston as more and more of the piston rod enters the working space, fluid will be displaced and the level will rise in the cylinder, the maximum level being indicated at 72 in Figure 1, and an air space remaining above the liquid as indicated at 73. It is common practice to provide a separate expansion chamber or reservoir to accommodate the excess fluid beyond that necessary for the damping of the piston strokes. This is desirable in order to contain the boundaries of the body of liquid and the body of air where foaming or emulsification might take place, and to exclude such foaming zones from the actual working chamber. In shock absorbers heretofore used, the piston rod is attached to the chassis and the cylinder and reservoir attached to the axle. Since the wheel-carrying portions of the vehicle are subjected to very rapid oscillations at considerable acceleration, the reservoir is consequently subjected to constant agitation resulting in such a mixing of the air and oil that the piston works in an emulsion rather than a liquid body and the entire law of its action is upset.

In the present arrangement where the usual construction is reversed in such a way that the piston rod is attached to the axle, and the cylinder and reservoir to the chassis, the reservoir is subjected to much less violent movement and the behavior of the shock absorber is greatly improved.

Furthermore, the advantages of the present invention are greatly augmented by the provision of novel means for controlling the flow between the working cylinder 70 and the reservoir 75. A partition plate 77 acts as a separator between the two chambers and this plate is preferably part of a casting indicated generally by the reference numeral 80 and comprising a stem 81 which is secured to an extension 82 which in turn is preferably welded to the top of the casing 11. The lower portion of the casting 80 is provided with a substantially cylindrical recess 85 into the lower end of which is threaded or forced a plug 86, the plug having a flange 87 which serves to clamp a thin metal disc 88 to the bottom surface of the partition plate 77. The partition plate 77 is spaced a few thousandths of an inch from the wall of the casing and is provided with an annular series of openings 90 as clearly shown in Figures 1 and 4, and these openings are valved by means of the thin laminar disc valve 88 so that when the piston 12 descends in the cylinder, oil is drawn through the openings 90 and past the flexed edges of the valve disc. The plug 86 is provided with a central passageway terminating inwardly in a valve seat against which the valve head 92 normally rests. The valve 92 is provided with a stem 93 and a coil spring 94 surrounds the stem and seats between a shoulder at the inner portion of the recess 85 and against the rear of the head 92. The walls of the casting 80 are provided with radial passageways 95 above the seat of the valve 92 and it will be readily seen that upon upward movement of the piston, fluid displaced by the increasing volume occupied by the piston rod 13 is forced past the valve 92 against the pressure of the spring 94, and then radially outwardly through the passageways 95 into the expansion chamber or reservoir 75.

Normally, the intermittent expansion and contraction of the fluid body and the passage of fluid through the central valved opening into the reservoir and outwardly through the openings 90 controlled by the flap valve 88, occurs without undue agitation and emulsions are prevented. On the very bad roads, however, the speed of the oil entering the reservoir past the valve 92 may reach velocities of several feet per second and consequently if this incoming flow of oil is not suppressed beneath the surface of the oil to a sufficiently great extent, intermingling at the oil level may occur and foaming or emulsification result. This is curtailed by means of the provision of the baffle 98, which in Figure 1 is shown as an integral part of the casting 80. This baffle effectively separates the incoming jets of oil and the upper level of the liquid and immediately improves the riding comfort.

The jets of fluid discharged through the radial passageways 95 into the expansion chamber shoot outwardly and impinge against the wall of the casing 11, where the jet is naturally divided, some of it curving downwardly toward the partition 77 and part curving upwardly along the wall of the cylinder or casing. The baffle 98 serves to break the force of the downwardly curving or rolling portion of the jet and confines the resulting turbulence to the space below the baffle. Some of the upwardly curving portion of the jet passes along the inner surface of the wall of the casing and would ordinarily have a tendency to break through the upper surface of the oil with but slightly diminished force. However, a further feature has been provided which serves to disrupt or divert any movement of fluid upwardly along the wall of the casing, and this is the bulging of the upper or head portion of the cylinder 11 as at 75'. This feature not only provides a discontinuity in the cylindrical wall surface but also affords greater capacity for the expansion chamber, which is a desirable provision, with no increase in the over-all length of the shock absorber. Thus the amount of rise and fall of the liquid level in the bulged portion of the reservoir can be made to be approximately only half that which it would otherwise be.

Alternative means for preventing or reducing emulsification at the oil level may be adopted. For example, the space 73 might be occupied by a resilient bladder filled with air or by a body of foam rubber either natural or synthetic, such as polyvinyl foam, "neoprene" foam, or the like. The air necessary for accommodating the change in oil volume is confined either in the bladder or in the resilient cells of the foam rubber body and therefore cannot be mixed with the oil to produce an emulsion.

Figure 9:
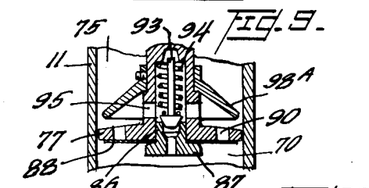
Figure 9 is a vertical sectional detail view showing a modified form of baffle for the expansion chamber.
Figure 10:
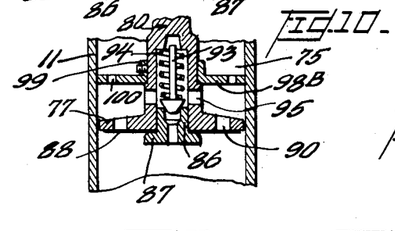
Figures 10 and 11 are views in vertical and horizontal section respectively of a further modification in the baffle arrangement.
Figures 11, 12:
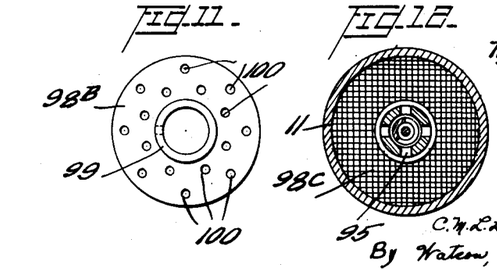
Figure 12 is a still further embodiment of the baffle feature in which a mesh screen is employed as a baffle.

Other embodiments of the suggested baffle arrangement are illustrated in Figures 9, 10, 11 and 12 of the drawings. In Figure 9 the baffle 98A is very similar to the baffle 98 of Figure 1 but is formed with a downward slope, giving the baffle a general frusto-conical configuration. In this case the radially outwardly projected jets from the openings 95 will be broken up by the baffle even before they strike the wall of the cylinder 11. In Figure 10 the baffle 98B extends all the way across the chamber 75 to the walls of the cylinder 11 and is made as a separate piece secured upon the casting 80 as by means of the ring 99. The baffle 98B is provided with perforations 100 through which the oil may pass and the direct jets broken. If desired, the features of providing openings in the baffle and also of spacing the baffle a very slight distance from the wall of the casing, may be incorporated in a single installation. In Figure 12 of the drawings a baffle 98C comprising wire mesh is employed.

The expansion chamber or reservoir and the valving arrangements just described cooperate fully with the laminating piston member with its valves which are arranged to relieve the pressure in opposite directions under conditions of stress. The valving of the piston by means of the valves 48, 48' and 58, 58' perform a function of somewhat less importance than the lamination of the fluid around the margins of the piston, but it cooperates in contributing to the efficient operation of the shock absorber in important ways. First, a complete study of the reactions transmitted by the road to the chassis through the intermediary of the spring suspension and shock absorber, proves that the efforts necessary for the shock absorber in order to damp the chassis adequately do not exceed a certain value. That value is close to 70–80 kilograms (155–176 lbs.) for most passenger automobiles, inasmuch as for these cars, the coefficient $f$ of the shock absorber is approximately two kilograms (4.40 lbs.) for a speed $v$ of one centimeter per second (0.393" per second). However, it has been proved that the relative speed $v$ of the axle and the chassis may reach upwardly of 150–170 centimeters per second (49–55 feet per second), when the wheel is submitted to very rapid movements, such as going over a rather deep hole. As a consequence the linear shock absorber may transmit to the chassis efforts or forces equal and sometimes greater than 300 kilograms (661 lbs.) which are much more than necessary for the damping of the chassis. This indicates the value of the provision of the "safety" by-pass valves in the piston in order to reduce the forces transmitted by the shock absorber to the chassis. Any force transmitted by the shock absorber which is greater than necessary for proper damping adds to the discomfort of the passengers and fatigue and wear to the chassis. Secondly, when the wheel is subjected to very rapid oscillations, the valving of the fluid through the piston is necessary in order to permit the expansion or anti-cavitation chamber to perform its adequate function. The safety valves adjacent the upper face of the piston should release under somewhat less pressure than the valve 92 which admits fluid to the expansion chamber or reservoir, otherwise the rapid upward movement of the piston would give rise to cavitation or the formation of a vacuum pocket in the lower part of the working cylinder 70. Also, the resistance of the springs for the valves 48 and 48' controlling the upward by-passing of fluid is preferably somewhat greater than that of the springs 58 and 58'.

Another advantageous result of the valving of the piston is the fact that in reducing the force transmitted to the chassis it is possible to use piston rods of smaller diameter. The average diameter of piston rods in shock absorbers of similar general nature now in use is about 12 millimeters or more (0.472"). In the applicant's construction the piston rod 13 may be 10 millimeters in diameter (0.393") which will be strong enough for use in connection with any standard passenger car. Tests have shown that under the worst possible conditions, piston rods of 10 millimeters in diameter have more of a margin of safety than is necessary and also the shock absorber evidences improved performance. The narrowing or attenuating of the piston rod reduces the dissymmetry between the phase of the shock absorber under compression and extension. Also, the compensating flow of oil entering the expansion chamber is less when the piston rod is of a smaller diameter.

The inversion of the shock absorber according to the present invention, by means of which the cylinder is secured to the chassis or body of the vehicle and the piston to the wheel mounting, necessitates a rather secure packing of the piston rod 13 where it enters the lower end of the cylinder 11. One preferred arrangement for packing the piston is shown in Figure 1 of the drawings. The walls of the cylinder 11 are shouldered or undercut as indicated at 105 and a steel disc 106 is fitted accurately therein so as to lie against the shoulder 105, the disc being provided with a central opening 107 to snugly accommodate the piston rod 13. A second metal disc 108, preferably made of the zinc alloy sold under the trademark Zamak (aluminum 4.0%, magnesium 0.04%, balance zinc; aluminum 4.0%, magnesium 0.04%, copper 1.0%, balance zinc), is then applied and next there is inserted a rubber or synthetic rubber disc 110 of particular dimensions. A second rubber disc 112 is also applied, there being inserted between the rubber discs a very thin metallic disc 113.

Next there is applied a perforated cap or disc 115 preferably made of an alloy such as Zamak, this element forming a guide bushing which cooperates with a second cap or bushing 116 made of similar materials to enclose between them a wiping washer 117 made of rubber or a synthetic rubber-like material. The wall of the cylinder 11 is further shouldered as at 118 opposite the first guide bushing 115 and the end of the wall is spun over the margins of the lowermost bushing 116 as indicated at 119. The two shoulders 105 and 118 on the wall of the lower end of the cylinder 11, against which the first disc 106 and the first guide bushing 115 respectively abut, fix the vertical height or thickness of the packing arrangement and thus determine the maximum pressure applied to the arrangement axially of the packing.

In Figure 13 of the drawings a similar piston packing or seal is shown between the rod 13 and the cylinder 11. Seated against the inner shoulder 105' of the wall 11 is a metal disc 106' provided with a central opening to snugly receive the piston rod 13. Then alternating with similar metal discs 107' and 108' are a series of rubber washers 110, of peculiar construction and dimensioning similar to the ones designated 110 and 112 in the embodiment shown in Figure 1. A somewhat heavier metallic washer 115' is laid over the lowermost rubber disc and the margins of the cylinder 11 are spun over this last-named element as at 119'.

The principal novel feature of both the packing arrangements just described resides in the dimensioning and compression of the rubber or synthetic rubber rings 110, 110' and 112. These rubber washers are not designed to be tightened by pressure axially of the piston rod but rather by pressures directed radially inwardly toward the axis of the rod. The rubber washers or discs are preferably punched from flat sheets of rubber rather than made by molding, since it has been found that such discs exhibit better resistance to wear.

Figure 14:
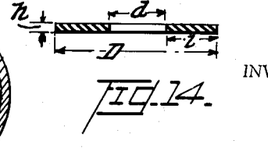
Figure 14 is a similar view of one of the rubber or plastic washers such as employed in Figures 1 and 13 for packing the piston rod.

One of the points of novelty residing in this aspect of the invention lies in the discovery the applicant has made regarding the preferred relationships between the stressed and unstressed diameters of the rubber or resilient discs employed in packing the piston rod. In Figure 14 of the drawings one of these rubber discs is shown in section in its free, relaxed, or undistorted condition wherein the diameter $d$ of the central opening is somewhat greater (or at least equal to) the diameter $d'$ of the piston rod, and in which the external diameter $D$ of the disc or washer is also greater than the internal diameter $D'$ of that portion of the cylinder 11 into which the discs are fitted.

If a disc were selected which in its relaxed condition had an internal diameter $d$ smaller than the diameter $d'$ of the piston rod, when the washer is placed in position on the rod, the external diameter $D$ of the washer is not appreciably modified. On the other hand, if the washer has a diameter $D$ greater than the diameter $D'$ of the cylinder, it is found that the internal diameter $d$ of the disc diminishes considerably when the disc is inserted. From this it follows that external tightening or creation of pressure between the cylinder and the outer periphery of the rubber discs can be obtained only by starting with a disc or washer of an external diameter $D$ greater than the diameter $D'$ of the cylinder, while the internal tightening or application of pressure to the piston rod can be obtained by starting with an internal diameter $d$ of the washer larger than the diameter $d'$ of the piston rod, the diameter of the central opening diminishing and the margins thereof bearing with considerable pressure against the piston rod, when the disc is inserted in the cylinder.

This is a quite surprising result and it has been found experimentally that the best conditions for providing such a packing or joint are obtained when one uses a disc with an interior free diameter $d$ greater than, or at least equal to, the diameter $d'$ of the spindle or rod. In other words, in a rubber joint or packing of this kind it is desirable to produce both the interior and exterior tightening or application of pressure only by urging the washer inwardly by pressure applied from the outer periphery. Apparently the optimum dimensioning is given by the relationship $$\frac{d}{d'} = \frac{D}{D'}$$

this dimensioning being that which achieves uniform plane compression in the entire mass of the joint. However, the relationship $$\frac{d}{d'} > \frac{D}{D'}$$

also gives excellent results.

Although it is preferred that the width $l$ of the disc be at least twice the thickness $h$, this may not necessarily hold true in all cases, although the width $l$ should be greater than the height $h$, the latter figure in such installations as disclosed herein being preferably in the vicinity of two or three millimeters.

The above described packing displays considerable advantages over the usual compressed packing since the latter requires a very great application of pressure on the packing, and in spite of such pressure, the packing has only a small amount of reserve of elasticity capable of compensating for wear.

A protective dust boot is preferably provided to enclose the exposed portions of the piston rod when the device is in expanded position. As shown in Figure 1 of the drawings a plate 125 is secured around the lower end of the piston rod 13 between a shoulder on the rod and the attaching ring 20 which is welded thereto. This plate is crimped or beaded and provided with an outer flange 126 around which is applied the lower shouldered end 127 of a resilient bellows 130. The upper end of the bellows is formed with a collar 132 and the intermediate portion is provided with the pleats or convolutions 133, whereby the bellows may be extended or contracted in accordance with the outward or inward movements of the piston rod 13. The annular plate 125 may be provided with one or more openings 135 through which air may pass. Since the rear springs of a motor vehicle have a greater amplitude than the front suspensions, it is preferred that the air space 73 above the oil level in the expansion chamber in the rear shock absorbers be somewhat greater than that in the front shock absorbers. Also, the calibration of the controlling factors, such as the laminating space 35 and the spring resistances, is so adjusted or selected as to provide a somewhat softer shock absorber at the rear of the car than at the forward end.

One of the foremost advantages afforded by the present invention resides in the fact that substantially the same diameter of the cylinder 11 may be maintained for practically all cars, the only variations necessary as between cars of different makes, models, and weights, being the overall length of the shock absorber, calibration of the size of the laminating passageway 35, and the resistances of the by-pass and expansion chamber springs.

Another advantage of the present shock absorber is that it has no "dead center," i. e., there is always a damping action regardless of the amplitude of movement of the piston.

Furthermore, in accordance with the present invention, the cylinder of the shock absorber is comprised by a single thickness of tubing which affords much better cooling of the oil or other working fluid contained in the cylinder. For example, it has been shown that in a fairly heavy passenger car equipped with a shock absorber of a commonly used type, and running over a very rough road at a speed of about eighty miles per hour, after the first few minutes there was no appreciable absorption of shocks and it was necessary to stop the car for about ten minutes in order to cool the oil before resuming speed. Temperatures reached in such a shock absorber under those conditions were close to 300° F., whereas in the shock absorber which is the subject of the present invention, under the same conditions, the oil rose no higher than 180° F.

As already mentioned, the forces transmitted to the chassis by shock absorbers of the usual type now employed are up to 700 lbs., whereas the present shock absorber transmits a force to the chassis in the neighborhood of 150 lbs. to 175 lbs. In the other shock absorbers which employ two or three or more concentric tubes in providing the cylindrical body of the absorber the conduction of heat is very inadequate. Also in these commonly employed devices, great heat is developed due to the extremely high velocity of the oil passing through the controlling orifices. For example, a normal displacement of piston is about from 1 to 2 meters per second (3.28 to 6.56 feet per second). At a speed of 1 meter (3.28 feet) per second the speed of flow of oil in the present shock absorber is approximately 30 meters (98 feet) per second. In a commonly used shock absorber for the same purpose, at a speed of 1 meter per second, the velocity of oil is about 333 meters (1,092 feet) per second.

Various changes and modifications may be made in the embodiments illustrated and described herein without departing from the scope of the invention as determined by the following claims.

Having thus described the invention, what is claimed as new and desired to be secured by Letters Patent is:

1. A direct acting shock absorber for controlling the relative movements of a sprung body and an unsprung body, comprising, in combination, a cylinder connected to one of said bodies, a piston connected to the other of said bodies and movable within said cylinder upon relative movement of the bodies, a damping medium in the cylinder, a chamber in the upper portion of the cylinder end having controlled means of communication with the portion of the cylinder in which the piston moves, said chamber being separated from the remainder of the cylinder in which the piston moves, by a fixed partition, at least two openings through said partition, a spring-loaded valve in one of said openings controlling flow from the cylinder to said chamber, and a thin flexible metal washer controlling flow through the other opening from said chamber to said cylinder, upon movement of the piston in the respective opposite directions.

2. A hydraulic shock absorber for the wheel suspensions of vehicles, comprising a cylindrical casing secured to the frame of the vehicle and enclosing a working chamber containing a hydraulic fluid, and a piston adapted to reciprocate in said working chamber and secured to the wheel mounting, a piston rod fixed to said piston at one end and to said mounting at the other and passing through a packed opening in one end of said casing, the periphery of said piston for the most part being spaced from the inner wall of the casing with a predetermined slight clearance through which fluid may pass from one side of the piston to the other and thus insure the damping of the wheel movements in proportion to fluid viscosity instead of by kinetic damping, at least two passageways through the piston from one side to the other, resiliently biased check valves in said passageways controlling the flow of fluid during compression and rebound strokes of the piston respectively, the check valves being of predetermined resistances so as to open only as a result of excessive or abnormal oscillation such as resulting from the vehicle encountering a depression or bump in the road surface, whereby during operation on normal road surfaces the damping is effected solely by the viscosity of the fluid passing through the clearance.

3. A hydraulic shock absorber for the wheel suspensions of vehicles, comprising a cylindrical casing secured to the frame of the vehicle and enclosing a working chamber containing a hydraulic fluid, and a piston adapted to reciprocate in said working chamber and secured to the wheel mounting, a piston rod fixed to said piston at one end and to said mounting at the other and passing through a packed opening in one end of said casing, the periphery of said piston for the most part being spaced from the inner wall of the casing with a predetermined slight clearance through which fluid may pass from one side of the piston to the other and thus insure the damping of the wheel movements in proportion to fluid viscosity instead of by kinetic damping, guide portions on said piston adapted to slidingly contact the inner wall of the casing to center the piston with respect to the casing but to permit fluid to pass to and from said clearance without hindrance, at least two passageways through the piston from one side to the other, resiliently biased check valves in said passageways controlling the flow of fluid during compression and rebound strokes of the piston respectively, the check valves being of predetermined resistances so as to open only as a result of excessive or abnormal oscillation such as resulting from the vehicle encountering a depression or bump in the road surface, whereby during operation on normal road surfaces the damping is effected solely by the viscosity of the fluid passing through the clearance.

4. A hydraulic shock absorber for the wheel suspensions of vehicles comprising a cylindrical casing secured to the frame of the vehicle and enclosing a working chamber containing a hydraulic fluid, and a piston adapted to reciprocate in said working chamber and secured to the wheel mounting, a piston rod fixed to said piston at one end and to said mounting at the other and passing through a packed opening in the lower end of said casing, the periphery of said piston for the most part being spaced from the inner wall of the casing with a predetermined slight clearance through which fluid may pass from one side of the piston to the other and thus insure the damping of the wheel movements in proportion to fluid viscosity instead of by kinetic damping, guide portions on said piston adapted to slidingly contact the inner wall of the casing to center the piston with respect to the casing but to permit fluid to pass to and from said clearance without hindrance, at least two passageways through the piston from one side to the other, valves in said passageways controlling the flow of fluid during compression and rebound strokes of the piston respectively, springs urging said valves toward closed positions and being of predetermined resistances so as to permit the valves to open only as a result of excessive or abnormal oscillation such as resulting from the vehicle encountering a depression or bump in the road surface, whereby during operation on normal road surfaces the damping is effected solely by the viscosity of the fluid passing through the clearance, an expansion chamber and reservoir in the upper end of the casing for containing working fluid displaced from the working chamber by the periodic entrance of additional portions of the piston rod, one-way inlet and return valves between said expansion chamber and said working chamber, and means for resiliently applying a predetermined resistance to opening of the inlet valve to the expansion chamber, the resistance offered by the return valve to the return flow of the fluid to the working chamber being negligible.

5. A hydraulic shock absorber of the class described, adapted to be disposed in parallel with the spring suspension of the vehicle wheels, and comprising a cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, said piston comprising two rigidly connected parts disposed face to face in a transverse plane and having at least one cavity in the abutting face of each part, corresponding cavities in the abutting faces being in registry to provide a valving pocket, an opening in an outer face of one of the piston parts providing communication between the pocket and the working chamber on that face of the piston, the opposite cavity in the other piston part being freely open to the working chamber on the opposite face of the piston except for a bridging web of negligible transverse cross-section, as compared with the free opening into the cavity around the web, a valve disposed in said pocket and seated in said opening to control fluid flow therethrough, a spring compressed between the rear portion of said valve and said web to urge said valve to seated position, said spring being of predetermined resilience to permit the valve to open and by-pass fluid upon the suspension sustaining unusually severe shocks, and a duplicate arrangement of pocket, cavities, opening, and valve in said two-part piston isolated from the first one and oppositely disposed in order to control the excess flow of fluid in the opposite direction.

6. The shock absorber set forth in claim 5 in which the abutting faces of said piston parts are provided respectively with diametrically extending tongue and groove mutually interlocking parts adapted to prevent relative rotation or lateral displacement of said parts and to aid in sealing off the respective valve pockets one from the other.

7. A hydraulic shock absorber of the class described, adapted to be disposed in parallel with the spring suspension of the vehicle wheels, and comprising a cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, said piston having an annular flange adjacent one face thereof of diameter greater than that of the effective damping portion and approximating the inside diameter of the cylinder, said flange serving to maintain the centering of the piston during operation, said flange being interrupted by a series of spaced notches throughout its periphery, said notches providing free access of fluid without damping from the face of the piston to the annular clearance space, said piston comprising two rigidly connected parts disposed face to face in a transverse plane and having at least one cavity in the abutting face of each part, corresponding cavities in the abutting faces being in registry to provide a valving pocket, an opening in an outer face of one of the piston parts providing communication between the pocket and the working chamber on that face of the piston, the opposite cavity in the other piston part being freely open to the working chamber on the opposite face of the piston except for a bridging web, a valve disposed in said pocket and seated in said opening to control fluid flow therethrough, a spring compressed between the rear portion of said valve and said web to urge said valve to seated position, said spring being of predetermined resilience to permit the valve to open and by-pass fluid upon the suspension sustaining unusually severe shocks, and a duplicate arrangement of pocket, cavities, opening, and valve in said two-part piston isolated from the first one and oppositely disposed in order to control the excess flow of fluid in the opposite direction.

8. A hydraulic shock absorber of the class described, adapted to be disposed in parallel with the spring suspension of the vehicle wheels, and comprising a cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, said piston comprising two parts connected to abut face to face in a transverse plane, axial openings in both parts for the reception of the upper end of the piston rod, the opening in the upper part being threaded for the reception of the threaded end of the rod and the opening in the lower part being shouldered to abut a corresponding shoulder on the rod, whereby screwing the rod into the upper opening will firmly unite the parts, the peripheral margin of one of said parts being cut away adjacent the plane of separation of the parts to provide an annular groove around the piston of considerable axial depth, a ring of material clamped in said groove and having the same clearance space with respect to the inner wall of said cylinder as the rest of the effective damping portion of the piston at a given mean temperature, said material having a coefficient of thermal expansion approximating the coefficient of thermal viscosity of the working fluid employed.

9. The arrangement set forth in claim 8 in which the fluid is a light hydrocarbon oil and the material of which the expansion ring is made is nylon.

10. A hydraulic shock absorber of the class described, adapted to be disposed in parallel with the spring suspension of the vehicle wheels, and comprising a single-walled cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, a stem supported by the upper portion of the cylinder and extending downwardly therein, a partition carried by the lower end of said stem and extending transversely of the axis of the cylinder and serving to set off an expansion chamber and reservoir in the upper end of the cylinder from the remainder of the cylinder which constitutes the working chamber, a central opening in said partition and extending into the stem to form a recess in the lower end thereof, at least one radial passageway in the stem above the partition providing communication between said recess and said expansion chamber, a spring pressed valve in the recess controlling flow therethrough into said expansion chamber, at least one hole in the partition and a resilient disc flap valve carried by the partition upon the underface thereof and preventing flow upwardly into said expansion chamber through said hole but permitting substantially free return flow therethrough.

11. A hydraulic shock absorber of the class described, adapted to be disposed in parallel with the spring suspension of the vehicle wheels, and comprising a cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, a stem supported by the upper portion of the cylinder and extending downwardly therein, a disc carried by the lower end of said stem and extending transversely of the axis of the cylinder and separated from the inner wall of said cylinder by an extremely narrow annular clearance and serving to set off an expansion chamber and reservoir in the upper end of the cylinder above the portion thereof which constitutes the working chamber, a central opening in said partition and extending into the stem to form a recess in the lower end thereof, at least one radial passageway in the stem above the partition providing communication between said recess and said expansion chamber, a spring pressed valve in the recess controlling flow therethrough into said expansion chamber, at least one hole in the partition and a resilient disc flap valve carried centrally by the partition upon the under-face thereof and preventing flow upwardly into said expansion chamber through said hole but permitting substantially free return flow therethrough.

12. In a hydraulic shock absorber for damping the movements of a vehicle spring suspension, a cylinder closed at one end and adapted to contain a hydraulic fluid, a piston reciprocating in said cylinder, a piston rod extending from said piston through a packed opening in the opposite end of said cylinder, a stem carried by said cylinder and extending inwardly from said first-named end thereof and having a disc secured to its inner end, extending in a plane at right angles to the axis of the cylinder, and serving to provide a partition to set off an expansion chamber or reservoir from the working chamber of the cylinder.

13. In a hydraulic shock absorber for damping the movements of a vehicle spring suspension, a single-walled cylinder closed at one end and adapted to contain a hydraulic fluid, a piston reciprocating in said cylinder, a piston rod extending from said piston through a packed opening in the opposite end of said cylinder, a stem carried by said cylinder and extending inwardly from said first-named end thereof and having a disc secured to its inner end, extending in a plane at right angles to the axis of the cylinder, and serving to provide a partition to set off an expansion chamber or reservoir from the working chamber of the cylinder, and valved openings leading through said partition to control the flow of fluid into and out of said expansion chamber respectively, to accommodate the displacement of fluid by the piston rod entering the cylinder.

14. In a hydraulic shock absorber for damping the movements of a vehicle spring suspension, a cylinder closed at one end and adapted to contain a hydraulic fluid, a piston reciprocating in said cylinder, a piston rod extending from said piston through a packed opening in the opposite end of said cylinder, a stem carried by said cylinder and extending inwardly from said first-named end thereof and having a disc secured to its inner end, extending in a plane at right angles to the axis of the cylinder, and serving to provide a partition to set off an expansion chamber or reservoir from the working chamber of the cylinder, and valved openings leading through said partition to control the flow of fluid into and out of said expansion chamber respectively, to accommodate the displacement of fluid by the piston rod entering the cylinder, the disc partition being of a diameter very slightly less than the inside diameter of said cylinder, whereby an extremely narrow annular passageway is provided around the margins of the partition from one chamber to the other.

15. A hydraulic shock absorber for damping the oscillations of a vehicle spring suspension comprising a normally vertically disposed cylinder closed at its upper end and adapted to be secured to the frame of the vehicle and containing a hydraulic fluid, a piston adapted to work in the cylinder and a piston rod extending from said piston through a packed opening in the lower end of the cylinder, a fixed transverse horizontal partition extending across said cylinder setting off an upper expansion chamber and reservoir from the main portion of the cylinder which comprises the working chamber, the level of liquid being maintained so that the upper surface is always in the reservoir above said partition, openings in said partition permitting passage of liquid to and from the reservoir upon the alternate movements of the piston rod into and out of the cylinder, the openings conducting liquid into the reservoir being directed radially outwardly therein toward the wall of the cylinder to impinge thereon, the walls of the cylinder at the uppermost portion of the reservoir being bulged outwardly at a point below the surface of the liquid, whereby any spurting of liquid upward along the inner surface of the walls will tend to be diverted before breaking through the surface of the liquid.

16. A hydraulic shock absorber for damping the oscillations of a vehicle spring suspension, comprising a normally vertically disposed cylinder closed at its upper end and adapted to be secured to the frame of the vehicle and containing a hydraulic fluid, a piston adapted to work in the cylinder and a piston rod extending from said piston through a packed opening in the lower end of the cylinder, a fixed transverse horizontal partition extending across said cylinder setting off an upper expansion chamber and reservoir from the main portion of the cylinder, which comprises the working chamber, the level of liquid being maintained so that the upper surface is always in the reservoir above said partition, openings in said partition permitting passage of liquid to and from the reservoir upon the alternate movements of the piston rod into and out of the cylinder, the openings conducting liquid into the reservoir being directed radially outwardly therein toward the wall of the cylinder to impinge thereon, and a circular baffle plate in said reservoir above said radial openings and extending radially outwardly from the axis of the cylinder toward the walls of the cylinder to break the flow of liquid from said openings and minimize turbulence and emulsification.

17. The device as set forth in claim 16 in which the baffle is of a generally conical configuration and sloping downwardly toward its outer periphery.

18. The device as set forth in claim 16 in which the baffle comprises a multi-perforated disc.

19. The device as set forth in claim 16 in which the baffle comprises a reticulated or mesh screen.

20. A direct acting shock absorber for controlling the relative movements of two members, one of said members being a vehicle frame and the other the wheel mounting of the vehicle, said shock absorber comprising a casing secured to one of said members and enclosing a cylindrical working chamber containing a damping fluid, a piston adapted to reciprocate in said working chamber upon relative movement of said members, a piston rod having one of its ends secured to said piston and the opposite end to the other of said members, said rod passing through a packed opening in one end of said casing, the periphery of said piston for the most part being spaced from the inner wall of said casing with a predetermined slight clearance through which fluid may pass from one side of the piston to the other in the form of a thin lamination, the stress on said lamination of fluid being in shear whereby damping of the normal wheel movements is according to fluid viscosity and not kinetic damping, guide means for maintaining the piston concentric with the cylinder to accurately insure the uniformity of the annular lamination, by-pass openings through said piston, and resiliently loaded safety by-pass valves controlling the passage of fluid through said openings to limit the damping effects of the shock absorber during excessively rapid or sudden movements of the wheel mounting as when encountering an obstacle or rough portion of a roadway, said guide means being provided on the piston and being of the same diameter as the internal diameter of the cylinder chamber and of material having a similar coefficient of expansion to the material of the casing but provided with non-throttling openings through which fluid may freely pass without significant damping effect, the effective portion of the piston which bounds the inner margin of the fluid laminating clearance space being made of a material more expansible under heat than the materials of which the guide portion of the piston and the casing are made, whereby the pure viscosity basis of the operation of the shock absorber will be maintained regardless of temperature.

21. A direct acting shock absorber for controlling the relative movements of two members, said shock absorber comprising a casing secured to one of said members and enclosing a cylindrical working chamber containing a damping fluid, a cylindrical piston adapted to reciprocate in said working chamber upon relative movement of said members, a piston rod having one of its ends secured to said piston and the opposite end to the other of said members, said rod passing through a packed opening in one end of said casing, the circular periphery of said piston being spaced uniformly from the inner wall of said casing with a predetermined slight annular clearance through which fluid may pass from one side of the piston to the other in the form of a thin lamination, the stress on said lamination of fluid being in shear whereby damping of the normal piston movements is according to fluid viscosity and not kinetic damping, by-pass openings through said piston, and resiliently loaded safety by-pass valves controlling the passage of fluid through said openings in both directions to limit the damping effects of the shock absorber during excessively rapid or sudden movements of one of the members, an expansion chamber and reservoir in the end of the casing opposite to the end through which the piston rod passes for receiving working fluid displaced from the working chamber by the periodic entrance of additional portions of the piston rod.

22. The shock absorber as set forth in claim 21 in which the end of the casing through which the piston rod passes is otherwise imperforate; and in which there are provided two resiliently biased one-way check valve means between the expansion chamber and the working chamber, one of said check valve means being an inlet valve to the expansion chamber and offering a predetermined yieldable resistance to flow under the compression stroke of the piston in the working chamber, the other check valve means comprising a return flow valve, the resistance offered by the return valve to the flow of fluid from the expansion chamber to the working chamber being negligible.

23. A direct acting shock absorber for controlling the relative movements of two members, said shock absorber comprising a casing secured to one of said members and enclosing a cylindrical working chamber containing a damping fluid, a cylindrical piston adapted to reciprocate in said working chamber upon relative movement of said members, a piston rod having one of its ends secured to said piston and its opposite end to the other of said members, said rod passing through a packed opening in one end of said casing, the circular periphery of said piston being spaced uniformly from the inner wall of said casing with a predetermined slight annular clearance through which fluid may pass from one side of the piston to the other in the form of a thin lamination, the stress on said lamination of fluid being in shear whereby damping of the normal piston movements is according to fluid viscosity and not kinetic damping, by-pass openings through said piston, and resiliently loaded safety by-pass valves controlling the passage of fluid through said openings in both directions to limit the damping effects of the shock absorber during excessively rapid or sudden movements of one of said members, a fixed partition within the casing separating the working chamber from an expansion chamber and reservoir in one end of the casing for containing work fluid displaced from the working chamber by the periodic entrance of additional portions of the piston rod, and one-way inlet and return valves in said partition between said expansion chamber and said working chamber, and means for resiliently applying a predetermined resistance to opening of the inlet valve to the expansion chamber, the resistance offered by the return valve to the return flow of the fluid to the working chamber being negligible, said resilient loading of the bypass valves controlling the piston openings being such as to cause the operation of the shock absorber upon compression and rebound to be substantially symmetrical, thus affording a true double-acting shock absorber.

24. A direct acting shock absorber for controlling the relative movements of two members, one of said members being a vehicle frame and the other the wheel mounting of the vehicle, said shock absorber comprising a casing secured to one of said members and enclosing a cylindrical working chamber containing a damping fluid, a piston adapted to reicprocate in said working chamber upon relative movement of said members, a piston rod having one of its ends secured to said piston and the opposite end to the other of said members, said rod passing through a packed opening in one end of said casing, at least one permanently open valveless and unobstructed passageway by-passing said piston, the dimensions of any transverse cross section of said passageway being extremely great in one direction and extremely narrow in the other direction, whereby the fluid passes through the passageway in the form of a thin film, and the stress on the film of fluid passing therethrough is in shear, at least one other passageway through said piston, resilient valves controlling the by-passage of fluid through said other pasageway, the resilient valve being prestressed to open at a pressure higher than that developed in the working chamber under normal running conditions on a relatively smooth road, whereby for ordinary running with low piston velocities the resistance afforded by the shock absorber is by pure viscosity damping, while at high piston velocities as on rough roads the resistance is by both the viscosity damping afforded by the shear of the fluid lamination and the spring resistance of the resilient valve.

25. The shock absorber as set forth in claim 24 in which at least one of the walls of the greater dimensions of the first named piston passageway is made at least partly of a material having a higher rate of expansion under heat than the material of which the opposite wall of the by-pass passageway is made, whereby the pure viscosity basis of the operation of the shock absorber will be maintained regardless of temperature.

26. A hydraulic shock absorber for damping the oscillations of a vehicle spring suspension comprising a normally vertically disposed cylinder closed at its upper end and adapted to be secured to the frame of the vehicle and containing a hydraulic fluid, a piston adapted to work in the cylinder and a piston rod extending from said piston through a packed opening in the lower end of the cylinder, a fixed transverse horizontal partition extending across said cylinder setting off an upper expansion chamber and reservoir from the main portion of the cylinder which comprises the working chamber, said expansion chamber and reservoir being the only such facility in the shock absorber assembly, the level of liquid being maintained so that the upper surface is always in the reservoir above said partition, openings in said partition permitting passage of liquid to and from the reservoir upon the alternate movements of the piston rod into and out of the cylinder, the walls of the cylinder at the uppermost portion of the reservoir being bulged smoothly outwardly at a point below the surface of the liquid giving said upper expansion chamber a bulbous appearance and a greater cross-sectional area than said working chamber, thereby maintaining the length of said shock absorber at a minimum for ready installation on all vehicles while at the same time affording sufficient expansion and reservoir space for the fluid, the smooth and gradual bulging of the reservoir affording a streamlined guide surface for the flow of excess fluid into the reservoir thus minimizing the creation of eddy currents and surface foaming.

27. In a hydraulic shock absorber for damping the movements of a vehicle spring suspension, a cylinder closed at one end and adapted to contain a hydraulic fluid, a piston reciprocating in said cylinder, a piston rod extending from said piston through a packed opening in the opposite end of said cylinder, a stem carried by said cylinder and extending inwardly at said first-named end thereof and having a disc secured to its inner end, extending in a plane at right angles to the axis of the cylinder, and serving to provide a partition to set off an expansion chamber or reservoir from the working chamber of the cylinder, said partition disc being separated from the inner wall of said cylinder by an extremely narrow clearance through which fluid may pass in opposite directions during the respective compression and rebound movements of the piston and rod.

28. A hydraulic shock absorber of the class described, adapted to be disposed in parallel with the spring suspension of the vehicle wheels, and comprising a cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, a disc supported by the upper portion of said cylinder and extending transversely of the axis thereof to set off an expansion chamber and reservoir in the upper end of the cylinder above the portion which constitutes the working chamber, said partition disc being separated from the inner wall of said cylinder by an extremely narrow clearance through which fluid may pass in the form of a thin lamination during the compression and rebound movements of the piston and rod.

29. A hydraulic shock absorber of the class described, adapted to be disposed in parallel with the spring suspension of the vehicle wheels, and comprising a cylinder closed at its upper end, secured to the frame of the vehicle, and containing a working fluid in liquid form, a piston disposed for reciprocation in said cylinder, a piston rod having its upper end secured to said piston, said rod extending through a packed opening in the lower end of the cylinder and having its lower end secured to a portion of the wheel mounting, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the suspension, a disc supported by the upper portion of said cylinder and extending transversely of the axis thereof to set off an expansion chamber and reservoir in the upper end of the cylinder above the portion which constitutes the working chamber, said partition disc being separated from the inner wall of said cylinder by an extremely narrow clearance through which fluid may pass in the form of a thin lamination during the compression and rebound movements of the piston and rod, and relief valves provided in both the piston and said partition disc for by-passing fluid through said piston and disc upon the occurrence of excessive pressures, as would be occasioned by the vehicle traveling on rough roads.

30. A direct acting shock absorber for controlling the relative movements of two members, said shock absorber comprising a casing secured to one of the members and enclosing a cylindrical working chamber containing a damping fluid, a cylindrical piston adapted to reciproate in said working chamber upon relative movement of said members, a piston rod having one of its ends secured to said piston and its opposite end to the other of said members, said rod passing through a centrally located packed opening in one end of said casing, said piston having an effective viscous damping portion the circumferential periphery of which is spaced uniformly from the inner wall of the casing with a predetermined slight clearance through which fluid may pass from one side of the piston to the other in the form of a thin lamination, the stress on said lamination of fluid being in shear whereby damping of the normal piston movements is according to fluid viscosity and not kinetic damping, the resistance being proportional to the velocity of the piston and independent of acceleration; a radially projecting annular guide flange on said piston approximating the internal diameter of the casing and adapted to have a sliding fit with the inner wall of the casing, said flange together with the guidance of the piston rod in the packed opening in the end of the casing serving to center the effective damping portion of the piston during operation to accurately maintain the uniform thickness of said thin shearing lamination, said flange provided with openings of sufficient area to permit the free passage of fluid without affecting the damping of the piston; and valve controlled by-pass openings for the passage of damping fluid from one side of the piston to the other.

31. A direct acting shock absorber for controlling the relative movements of two members, said shock absorber comprising a casing secured to one of the members and enclosing a cylindrical working chamber containing a damping fluid, a cylindrical piston adapted to reciprocate in said working chamber upon relative movement of said members, a piston rod having one of its ends secured to said piston and its opposite end to the other of said members, said rod passing through a centrally located packed opening in one end of said casing, said piston having an effective viscous damping portion the circumferential periphery of which is spaced uniformly from the inner wall of the casing with a predetermined slight clearance through which fluid may pass from one side of the piston to the other in the form of a thin lamination, the stress on said lamination of fluid being in shear whereby damping of the normal piston movements is according to fluid viscosity and not kinetic damping, the resistance being proportional to the velocity of the piston and independent of acceleration; a radially projecting annular guide flange on said piston approximating the internal diameter of the casing and adapted to have a sliding fit with the inner wall of the casing, said flange together with the guidance of the piston rod in the packed opening in the end of the casing serving to center the effective damping portion of the piston during operation to accurately maintain the uniform thickness of said thin shearing lamination, said flange provided with notches in the peripheral margin thereof, said notches being of sufficient area to permit the free passage of fluid without affecting the damping of the piston; and valve controlled by-pass openings for the passage of damping fluid from one side of the piston to the other.

32. A direct acting shock absorber for controlling the relative movements of two members, said shock absorber comprising a casing secured to one of the members and enclosing a cylindrical working chamber containing a damping fluid, a cylindrical piston adapted to reciprocate in said working chamber upon relative movement of said members, a piston rod having one of its ends secured to said piston and its opposite end to the other of said members, said rod passing through a centrally located packed opening in one end of said casing, said piston having an effective viscous damping portion the circumferential periphery of which is spaced uniformly from the inner wall of the casing with a predetermined slight clearance through which fluid may pass from one side of the piston to the other in the form of a thin lamination, the stress on said lamination of fluid being in shear whereby damping of the normal piston movements is according to fluid viscosity and not kinetic damping, the resistance being proportional to the velocity of the piston and independent of acceleration; a radially projecting annular guide flange on said piston approximating the internal diameter of the casing and adapted to have a sliding fit with the inner wall of the casing, said flange together with the guidance of the piston rod in the packed opening in the end of the casing serving to center the effective damping portion of the piston during operation to accurately maintain the uniform thickness of said thin shearing lamination, said flange provided with openings therethrough of sufficient area to permit the free passage of fluid without affecting the damping of the piston; the guide flange portion of the piston being made of material having substantially the same coefficient of thermal expansion as that of which the casing is made, whereby the close sliding fit of the flange with the wall of the casing is maintained, and at least an annular peripheral portion of the effective damping portion of the piston being of a material which is expansible under heat to a greater degree and at a greater rate than the material of which the guide flange of the piston and the casing are made, whereby the pure viscosity basis of the operation of the shock absorber will be maintained regardless of temperature.

33. A hydraulic shock absorber of the class described comprising a cylinder closed at one end and containing a working fluid in liquid form, a piston disposed for reciprocation in said cylinder, a piston rod having one of its ends secured to said piston, said rod extending through a packed opening in the opposite end of said cylinder, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the shock absorber, a disc supported at the first named end of said cylinder and extending transversely of the axis thereof to set off an expansion chamber and reservoir in the said end of the cylinder outwardly of the portion which constitutes the working chamber, said partition disc being separated from the inner wall of said cylinder by an extremely narrow annular clearance through which fluid may pass in the form of a thin lamination during the compression and rebound movements of the piston and rod.

34. A hydraulic shock absorber of the class described comprising a cylinder closed at one end and containing a working fluid in liquid form, a piston disposed for reciprocation in said cylinder, a piston rod having one of its ends secured to said piston, said rod extending through a packed opening in the opposite end of said cylinder, the periphery of the effective damping portion of said piston being spaced slightly from the inner walls of the cylinder to provide a narrow annular clearance space for the by-passing of working fluid upon reciprocation of said piston to effect viscous damping of both the compression and rebound movements of the shock absorber, a disc supported at the first named end of said cylinder and extending transversely of the axis thereof to set off an expansion chamber and reservoir in the said end of the cylinder outwardly of the portion which constitutes the working chamber, said partition disc being separated from the inner wall of said cylinder by an extremely narrow annular clearance through which fluid may pass in the form of a thin lamination during the compression and rebound movements of the piston and the rod, and relief valves provided in both the piston and said partition disc for by-passing fluid through said piston and disc upon the occurrence of excessive pressures, as would be occasioned by a vehicle to which the shock absorber might be applied travelling on rough roads.

References Cited in the file of this patent

UNITED STATES PATENTS

| | | |
|---|---|---|
| 390,797 | Nickerson | Oct. 9, 1888 |
| 1,407,320 | Bouché | Feb. 21, 1922 |
| 1,616,091 | Scott | Feb. 1, 1927 |
| 1,700,044 | Hales | Jan. 22, 1929 |
| 1,871,287 | Whittaker | Aug. 9, 1932 |
| 1,967,640 | Wallace | July 24, 1934 |
| 1,992,526 | Funston | Feb. 26, 1935 |
| 2,038,032 | Flynn | Apr. 21, 1936 |
| 2,149,040 | Binder et al. | Feb. 28, 1939 |
| 2,252,771 | Katcher | Aug. 19, 1941 |
| 2,342,381 | Thornhill | Feb. 22, 1944 |
| 2,369,007 | Beecher | Feb. 6, 1945 |
| 2,410,176 | Magrum | Oct. 29, 1946 |

FOREIGN PATENTS

| | | |
|---|---|---|
| 370,364 | France | Dec. 18, 1906 |
| 299,670 | Great Britain | Nov. 1, 1928 |
| 549,041 | Great Britain | Nov. 4, 1942 |
| 705,634 | Germany | May 5, 1941 |